US012747176B2

(12) United States Patent
Bai et al.

(10) Patent No.: US 12,747,176 B2
(45) Date of Patent: Sep. 29, 2026

(54) ELECTROCHEMICAL NITROGEN AND PHOSPHORUS REMOVAL DEVICE AND METHOD

(71) Applicant: BEIJING DRAINAGE GROUP CO., LTD, Beijing (CN)

(72) Inventors: Yongsheng Bai, Beijing (CN); Jiang Chang, Beijing (CN); Bojun Su, Beijing (CN); Luyuan Shi, Beijing (CN); Jun Han, Beijing (CN); Yao Liu, Beijing (CN); Lixin Yu, Beijing (CN); Huanhuan Wang, Beijing (CN)

(73) Assignee: BEIJING DRAINAGE GROUP CO., LTD, Beijing (CN)

( * ) Notice: Subject to any disclaimer, the term of this patent is extended or adjusted under 35 U.S.C. 154(b) by 472 days.

(21) Appl. No.: 18/548,274

(22) PCT Filed: Nov. 25, 2021

(86) PCT No.: PCT/CN2021/133132

§ 371 (c)(1),
(2) Date: Aug. 29, 2023

(87) PCT Pub. No.: WO2022/199096

PCT Pub. Date: Sep. 29, 2022

(65) Prior Publication Data

US 2024/0140848 A1 May 2, 2024

(30) Foreign Application Priority Data

Mar. 26, 2021 (CN) ......................... 202110326660.9

(51) Int. Cl.
*C02F 9/00* (2023.01)
*C02F 1/00* (2023.01)
(Continued)

(52) U.S. Cl.
CPC ................ *C02F 9/00* (2013.01); *C02F 1/006* (2013.01); *C02F 1/001* (2013.01);
(Continued)

(58) Field of Classification Search
CPC .. C02F 9/00; C02F 1/006; C02F 1/001; C02F 1/46114; C02F 1/463; C02F 1/4672;
(Continued)

(56) References Cited

U.S. PATENT DOCUMENTS

2011/0174742 A1 7/2011 Blum

FOREIGN PATENT DOCUMENTS

CN 105271615 A 1/2016
CN 107500399 A 12/2017
(Continued)

*Primary Examiner* — Hayden Brewster
(74) *Attorney, Agent, or Firm* — FisherBroyles, LLP; Roger L. Browdy; Ronni S. Jillions

(57) ABSTRACT

An electrochemical nitrogen and phosphorus removal device includes a three-dimensional electro-catalytic oxidation unit reactor, a three-dimensional electro-biological coupling unit reactor, a light filter material filter unit reactor and a three-dimensional electro-flocculation phosphorus removal unit reactor; a water outlet pipe of the light filter material filter unit reactor is connected to both a main water outlet pipe and a water inlet pipe of the three-dimensional electro-flocculation phosphorus removal unit reactor; and a water outlet pipe of the three-dimensional electro-flocculation phosphorus removal unit reactor is connected to a water inlet pipe of the light filter material filter unit reactor through a reflux pump and a check valve. The device can achieve the purpose of efficient sewage treatment by the combined action of electrochemical flocculation, electro-catalytic oxidation and electro-active microorganisms.

10 Claims, 3 Drawing Sheets

(51) Int. Cl.
*C02F 1/461* (2023.01)
*C02F 1/463* (2023.01)
*C02F 1/467* (2023.01)
*C02F 3/00* (2023.01)
*C02F 3/34* (2023.01)
*C02F 101/10* (2006.01)
*C02F 101/16* (2006.01)

(52) U.S. Cl.
CPC . *C02F 1/46114* (2013.01); *C02F 2001/46142* (2013.01); *C02F 1/463* (2013.01); *C02F 1/4672* (2013.01); *C02F 3/005* (2013.01); *C02F 3/34* (2013.01); *C02F 2101/105* (2013.01); *C02F 2101/16* (2013.01); *C02F 2201/005* (2013.01); *C02F 2201/46175* (2013.01); *C02F 2203/006* (2013.01); *C02F 2303/16* (2013.01)

(58) Field of Classification Search
CPC .. C02F 3/005; C02F 3/34; C02F 2001/46142; C02F 2101/105; C02F 2101/16; C02F 2201/005; C02F 2201/46175; C02F 2203/006; C02F 2303/16; C02F 1/46109; C02F 3/341; C02F 2001/46133; C02F 2303/14; Y02W 10/10
See application file for complete search history.

(56) References Cited

FOREIGN PATENT DOCUMENTS

CN 108249529 A 7/2018
CN 111253003 A 6/2020
CN 113149343 A 7/2021

ELECTROCHEMICAL NITROGEN AND PHOSPHORUS REMOVAL DEVICE AND METHOD

FIELD OF TECHNOLOGY

The present disclosure belongs to the technical field of wastewater treatment, and specifically relates to an electrochemical nitrogen and phosphorus removal device and a method.

BACKGROUND

At present, various areas have increasingly strict sewage treatment and discharge standards, and water sources in sensitive areas have a prominent pollution problem, which are required to be treated urgently. According to traditional biological nitrogen and phosphorus removal methods, demands of biological nitrogen and phosphorus removal for carbon sources can be met simultaneously only when original sewage has a biochemical oxygen demand 5/total nitrogen (BOD5/TN) value of greater than 4-6 and a biochemical oxygen demand 5/total phosphorus (BOD5/TP) value of greater than 20, and sewage having a chemical oxygen demand (COD) value of less than 200 mg/L and a chemical oxygen demand/total nitrogen (COD/TN) value of less than 8 is usually called low-carbon source sewage. As for high-ammonia nitrogen and low-carbon source domestic sewage with a high ammonia nitrogen content and an extremely low carbon/nitrogen (C/N) ratio, biological nitrogen and phosphorus removal processes will have the problems of long retention time, high adding costs of agents such as carbon sources and alkaline agents, increase of sludge production and oxygen consumption and the like during applications, further increasing investment and operation costs and maintenance difficulty of decentralized sewage treatment projects. Therefore, the development of an economical and efficient synchronous nitrogen and phosphorus removal process for sewage treatment has a great application prospect for such low-carbon source decentralized domestic sewage.

Electrochemical oxidation methods have been widely concerned due to the advantages of small occupied area, increase of a biochemical oxygen demand/chemical oxygen demand (B/C) value, sterilization and disinfection functions, less influence of temperature, simple operation, simplicity in control, no production of sludge, no addition of agents, little production of mud, direct oxidization of most of ammonia nitrogen into nitrogen and the like. Two-dimensional electro-oxidation achieves the purpose of removing ammonia nitrogen mainly by means of an indirect oxidation action of an anode, and has the disadvantages of low current efficiency and high energy consumption. In current studies, methods for reducing energy consumption by adding a chlorine salt cannot be converted into applications, while studies on three-dimensional electrodes have been gradually concerned at home and abroad. Compared with traditional two-dimensional electrodes, a three-dimensional electrode method has the advantages that due to the introduction of particle electrodes, an electrode surface area and a reaction rate are effectively increased, a higher reaction speed is obtained, a smaller occupied area is used, a lower energy efficiency ratio can be achieved without adding a salt, secondary pollution is avoided, the method can be used separately or in combination with other technologies, and standardization and productization are easy. At present, methods for optimizing a three-dimensional electro-catalytic oxidation technology mainly focus on the development of efficient particle electrodes, catalysts, electrode plates, reaction devices and the like, and pay little attention to optimization of operation control systems. However, the optimization of operation control systems by means of proper means to keep an electro-catalytic oxidation reaction in a high-efficiency section has higher operability in practical engineering applications. Therefore, the development of an economical and efficient pretreatment ammonia removal device for decentralized sewage and a method based on a three-dimensional electro-catalytic oxidation ammonia removal technology is of important practical significance.

As for an electro-biological coupling process, an electrochemical action and a biological action are combined. In an enhanced environment of an external electric field, the activity of a microbial enzyme system is enhanced with appropriate increase of the field intensity, an enzymatic reaction rate is increased, and convenience is provided for improving the ability of microorganisms to treat pollutants. A cell mitosis cycle is shortened, a proliferation rate is increased, and growth and reproduction rates of microorganisms in biological communities are increased. The permeability of cell membranes is improved, and the mass transfer of a matrix fluid is enhanced by an appropriate electric field intensity. $H_2$ produced in an electrolytic process can also be used. By hydroautotrophic denitrifying bacteria to carry out a denitrification reaction. Meanwhile, organic carbon sources in systems can also be used as electron donors for heterotrophic denitrifying bacteria. Therefore, the process can save carbon sources during operation and is suitable for deep nitrogen removal of low C/N reclaimed water. A lot of studies have been conducted on theories and applications of electrode-biofilm reactors for sewage treatment at home and abroad. However, productization and engineering applications have not been achieved yet. Therefore, the development of an economical acid efficient decentralized sewage treatment device and a method based on a three-dimensional electro-biological coupling technology is of important practical significance.

Two-dimensional electro-flocculation has been gradually applied in the field of phosphorus removal of decentralized sewage, but still has the problems that the energy consumption is high, total phosphorus in effluent water cannot meet high discharge standards and the like. In contrast, three-dimensional electro-flocculation has the advantages of higher specific surface areas of electrodes, lower energy consumption, higher removal efficiency and the like. Therefore, the development of an economical and efficient phosphorus removal device for sewage treatment and a method based on a three-dimensional electro-flocculation technology is of important practical significance. Moreover, most of phosphorus in the biosphere flows unidirectionally, and phosphate rocks have extremely limited reserves. In China, the phosphate rocks having a low impurity content and high quality in phosphate rock reserves are expected to be completely mined in the next 10 to 15 years. Therefore, the development of a technology for recovering phosphorus resources from sewage is of important practical significance.

Therefore, based on current development conditions of the above technologies, it is urgent to propose a novel electrochemical nitrogen and phosphorus removal device and a method having a good application prospect.

SUMMARY

Aiming at the defects of the prior art, the present disclosure provides an electrochemical nitrogen and phosphorus removal device and a method. The present disclosure can achieve the purpose of efficient sewage treatment by means of the combined action of electrochemical flocculation, electro-catalytic oxidation and electro-active microorganisms. The device and the method are especially suitable for treatment of domestic sewage with a high ammonia nitrogen content and low N ratio, and have the advantages of high nitrogen and phosphorus removal efficiency, short hydraulic retention time, low investment and operation costs, simplicity in operation control, less influence of temperature, energy conservation, environmental friendliness and the like.

In order to achieve the above purpose, on the one hand, the present disclosure provides an electrochemical nitrogen and phosphorus removal device. The device includes a three-dimensional electro-catalytic oxidation unit reactor, a three-dimensional electro-biological coupling unit reactor, a light filter material filter unit reactor and a three-dimensional electro-flocculation phosphorus removal unit reactor;

a main water inlet pipe, the three-dimensional electro-catalytic oxidation unit reactor, the three-dimensional electro-biological coupling unit reactor and the light filter material filter unit reactor are sequentially connected;

a water outlet pipe of the light filter material filter unit reactor is connected to both a main water outlet pipe and a water inlet pipe of the three-dimensional electro-flocculation phosphorus removal unit reactor; and a water outlet pipe of the three-dimensional electro-flocculation phosphorus removal unit reactor is connected to a water inlet pipe of the light filter material filter unit reactor through a reflux pump and a check valve.

An aeration pipe and a blow-down pipe are provided at bottoms of tanks of the three-dimensional electro-catalytic oxidation unit reactor, the three-dimensional electro-biological coupling unit reactor, the light filter material filter unit reactor and the three-dimensional electro-flocculation phosphorus removal unit reactor, respectively.

On the other hand, the present disclosure provides an electrochemical nitrogen and phosphorus removal method. The method uses the electrochemical nitrogen and phosphorus removal treatment device and includes the following steps:

S1: starting the three-dimensional electro-catalytic oxidation unit reactor, the three-dimensional electro-biological coupling unit reactor, the light filter material filter unit reactor and the three-dimensional electro-flocculation phosphorus removal unit reactor; opening the aeration pipes of the three-dimensional electro-catalytic oxidation unit reactor, the three-dimensional electro-biological coupling unit reactor and the three-dimensional electro-flocculation phosphorus removal unit reactor; and turning on a first power supply, a second power supply and a third power supply;

S2: transporting sewage to the electrochemical nitrogen and phosphorus removal treatment device through the main water inlet pipe and enabling the sewage to flow sequentially through the three-dimensional electro-catalytic oxidation unit reactor, the three-dimensional electro-biological coupling unit reactor and the light filter material filter unit reactor; and S3: discharging one part of effluent water of the light filter material filter unit reactor from the electrochemical nitrogen and phosphorus removal treatment device through the main water outlet pipe; transporting another part of the effluent water of the light filter material filter unit reactor to the three-dimensional electro-flocculation phosphorus removal unit reactor; and enabling effluent water of the three-dimensional electro-flocculation phosphorus removal unit reactor to flow back to the light filter material filter unit reactor through the reflux pump and the check valve.

Technical schemes of the present disclosure have the following beneficial effects.

1. The present disclosure can achieve the purpose of efficient sewage treatment by means of the combined action of electrochemical flocculation, electro-catalytic oxidation and electro-active microorganisms. The device and the method are especially suitable for treatment of domestic sewage with a high ammonia nitrogen content and a low C/N ratio. Compared with traditional biochemical processes, the device and the method can obviously reduce the consumption of agents such as carbon sources and alkaline agents and can reduce an operation cost by 30-40%.
2. An electrochemical and biological coupling nitrogen and phosphorus removal process is used by the present disclosure, so that the total hydraulic retention time can be shortened to be less than 10 hours, and an engineering construction cost is significantly reduced.
3. A bidirectional pulse power supply can be used in the present disclosure, which not only effectively prevents passivation of electrodes, but also can reduce power consumption by 15-35% compared with ordinary power supplies.
4. The three-dimensional electro-flocculation phosphorus removal unit reactor of the present disclosure uses particle electrodes as sacrificial electrodes, and has the advantages of good treatment effect, low energy consumption, convenience in supplement and replacement of particle electrodes and the like compared with electro-flocculation systems consuming electrode plates.
5. The present disclosure has high total nitrogen and total phosphorus removal efficiency and low engineering construction and operation costs. By means of the combined action of electrochemical flocculation, electro-catalytic oxidation and electro-active microorganisms, a phosphorus and nitrogen removal effect on decentralized high-ammonia nitrogen and low-carbon source domestic sewage can be significantly enhanced. Meanwhile, after the sewage is treated by the device and the method of the present disclosure, a small sludge production is obtained, and a treatment cost of remaining sludge can be saved.
6. According to the present disclosure, phosphorus resources can be recovered to a certain extent, phosphorus in sewage is converted into a phosphate fertilizer, and a certain economic value is achieved.

Other features and advantages of the present disclosure will be described in detail in the following description of the embodiments.

BRIEF DESCRIPTION OF THE DRAWINGS

The above contents and other purposes, features and advantages of the present disclosure will become more apparent from a more detailed description of exemplary embodiments of the present disclosure with combination of the accompanying drawings, wherein same reference numerals generally refer to same parts in the exemplary embodiments of the present disclosure.

Numerals in the drawings are as follows.

Figure 1:
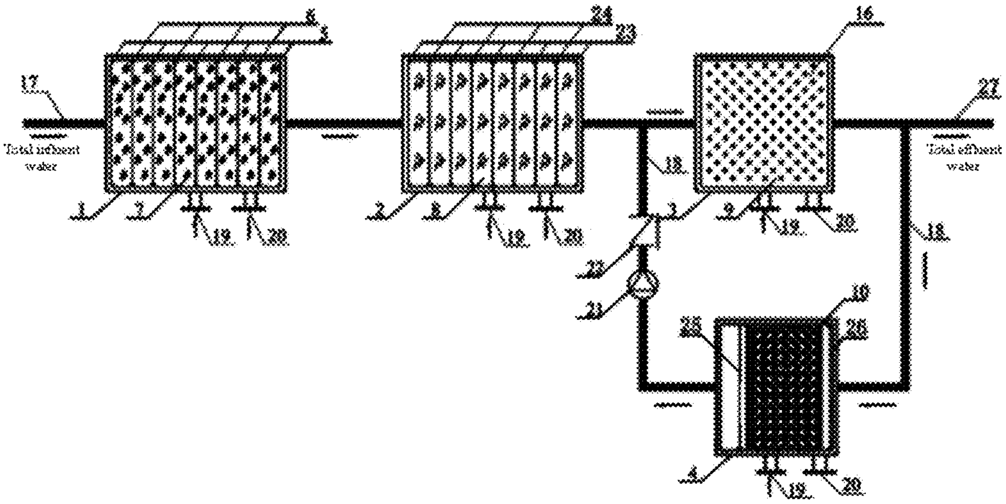
FIG. 1 shows a schematic diagram of an electrochemical nitrogen and phosphorus removal device provided in Example 1 of the present disclosure.

1, three-dimensional electro-catalytic oxidation unit reactor; 2, three-dimensional electro-biological coupling unit reactor; 3, light filter material filter unit reactor; 4, three-dimensional electro-flocculation phosphorus removal unit reactor; 5, first anode plate; 6, first cathode plate; 7, first particle electrode; 8, second particle electrode; 9, light filter material; 10, third particle electrode; 11, first power supply; 12, second power supply; 13, third power supply; 14, first lower filter plate; 15, filter material basket support; 16, filter material basket; 17, main water inlet pipe; 18, reflux pipe; 19, aeration pipe; 20, blow-down pipe; 21, reflux pump; 22, check valve; 23, second anode plate; 24, second cathode plate; 25, third anode plate; 26, third cathode plate; 27, main water outlet pipe; 28, water inlet pipe of the three-dimensional electro-catalytic oxidation unit reactor; 29, water outlet pipe of the three-dimensional electro-catalytic oxidation unit reactor; 30, water inlet pipe of the three-dimensional electro-biological coupling unit reactor; 31, water outlet pipe of the three-dimensional electro-biological coupling unit reactor; 32, water inlet pipe of the light filter material filter unit reactor; 33, water outlet pipe of the light filter material filter unit reactor; 34, water inlet pipe of the three-dimensional electro-flocculation phosphorus removal unit reactor; 35, water outlet pipe of the three-dimensional electro-flocculation phosphorus removal unit reactor; 36, second lower filter plate; 37, third lower filter plate; and 38, first upper filter plate.

DESCRIPTION OF THE EMBODIMENTS

Preferred embodiments of the present disclosure will be described in more detail below. Although the preferred embodiments of the present disclosure have been described below, it is to be understood that the present disclosure may be embodied in a variety of forms and should not be limited by the embodiments set forth herein. On the contrary, these embodiments are provided to make the present disclosure more thorough and complete and to fully convey the scope of the present disclosure to persons skilled in the art.

On the one hand, the present disclosure provides an electrochemical nitrogen and phosphorus removal device. The device includes a three-dimensional electro-catalytic oxidation unit reactor, a three-dimensional electro-biological coupling unit reactor, a light filter material filter unit reactor and a three-dimensional electro-flocculation phosphorus removal unit reactor;

a main water inlet pipe, the three-dimensional electro-catalytic oxidation unit reactor, the three-dimensional electro-biological coupling unit reactor and the light filter material filter unit reactor are sequentially connected;

a water outlet pipe of the light filler material filter unit reactor is connected to both a main water outlet pipe and a water inlet pipe of the three-dimensional electro-flocculation phosphorus removal unit reactor; and a water outlet pipe of the three-dimensional electro-flocculation phosphorus removal unit reactor is connected to a water inlet pipe of the light filter material filter unit reactor through a reflux pump and a check valve.

An aeration pipe and a blow-down pipe are provided at bottoms of tanks of the three-dimensional electro-catalytic oxidation unit reactor, the three-dimensional electro-biological coupling unit reactor, the light filter material filter unit reactor and the three-dimensional electro-flocculation phosphorus removal unit reactor, respectively.

According to the present disclosure, preferably, the tanks of the three-dimensional electro-catalytic oxidation unit reactor, the three-dimensional electro-biological coupling unit reactor, the light filter material filter unit reactor and the three-dimensional electro-flocculation phosphorus removal unit reactor are all made from a polymer insulation material.

According to the present disclosure, preferably, a water inlet pipe of the three-dimensional electro-catalytic oxidation unit reactor is arranged at an upper part or a lower part of the tank of the three-dimensional electro-catalytic oxidation unit reactor, and a water outlet pipe of the three-dimensional electro-catalytic oxidation unit reactor and the water inlet pipe of the three-dimensional electro-catalytic oxidation unit reactor are arranged diagonally;

a plurality of first cathode plates, a plurality of first anode plates, first particle electrodes and a first lower filter plate are arranged between the water inlet pipe and the water outlet pipe of the three-dimensional electro-catalytic oxidation unit reactor; the plurality of first cathode plates and the plurality of first anode plates are arranged in a staggered manner and connected to a negative electrode and a positive electrode of a first power supply through cables, respectively; the first particle electrodes are distributed between the plurality of first cathode plates and the plurality of first anode plates; and the first lower filter plate is arranged at lower ends of the plurality of first cathode plates and the plurality of first anode plates.

According to the present disclosure, preferably, a water inlet pipe of the three-dimensional electro-biological coupling unit reactor is arranged at an upper part or a lower part of the tank of the three-dimensional electro-biological coupling unit reactor, and a water outlet pipe of the three-dimensional electro-biological coupling unit reactor and the water inlet pipe of the three-dimensional electro-biological coupling unit reactor are arranged diagonally;

a plurality of second cathode plates, a plurality of second anode plates, second particle electrodes and a second lower filter plate are arranged between the water inlet pipe and the water outlet pipe of the three-dimensional electro-biological coupling unit reactor; the plurality of second cathode plates and the plurality of second anode plates are arranged in a staggered manner and connected to a negative electrode and a positive electrode of a second power supply through cables, respectively; the second particle electrodes are distributed between the plurality of second cathode plates and the plurality of second anode plates; and the second lower filter plate is arranged at lower ends of the plurality of second cathode plates and the plurality of second anode plates.

According to the present disclosure, preferably, the water outlet pipe of the light filter material filter unit reactor is connected to the water inlet pipe of the three-dimensional electro-flocculation phosphorus removal unit reactor through a reflux pipe;

the water inlet pipe of the light filter material filter unit reactor is arranged at an upper part or a lower part of the tank of the light filter material filter unit reactor, and the water outlet pipe of the light filter material filter unit reactor and the water inlet pipe of the light filter material filler unit reactor are arranged diagonally;

and a third lower filter plate, a first upper filter plate and a light filter material arranged between the third lower filter plate and the first upper filter plate are arranged between the water inlet pipe and the water outlet pipe of the light filter material filter unit reactor.

According to the present disclosure, preferably, the water inlet pipe and the water outlet pipe of the three-dimensional electro-flocculation phosphorus removal unit reactor are arranged on two sides of an upper part of the tank of the three-dimensional electro-flocculation phosphorus removal unit reactor, respectively; a filter material basket is movably arranged at a position, close to the water inlet pipe of the three-dimensional electro-flocculation phosphorus removal unit reactor, in the tank of the three-dimensional electro-flocculation phosphorus removal unit reactor; third particle electrodes are arranged in the filter material basket; a plurality of third cathode plates and a plurality of third anode plates are arranged on two opposite sides of the filter material basket, respectively, and the plurality of third cathode plates and the plurality of third anode plates are connected to a negative electrode and a positive electrode of a third power supply through cables, respectively; and bottom edges of the filter material basket, the plurality of third cathode plates and the plurality of third anode plates form a liquid channel with the bottom of the tank of the three-dimensional electro-flocculation phosphorus removal unit reactor through a filter material basket support.

According to the present disclosure, preferably, the first cathode plates, the second cathode plates and the third cathode plates are independently selected from a titanium electrode, a titanium-based electrode with a metal oxide coating or a stainless steel electrode; the first anode plates, the second anode plates and the third anode plates are independently selected from a titanium electrode or a titanium-based electrode with a metal oxide coating; and preferably, the metal oxide coating includes at least two of stannic oxide, zinc oxide, titanium dioxide and rare earth metal oxides.

According to the present disclosure, preferably, an electrode spacing between the first cathode plates and the first anode plates and an electrode spacing between the second cathode plates and the second anode plates are independently 10-200 mm.

According to the present disclosure, preferably, the first cathode plates, the second cathode plates, the third cathode plates, the first anode plates, the second anode plates and the third anode plates are independently selected from a flat plate, a mesh plate, a perforated plate or a grid plate.

According to the present disclosure, preferably, the first particle electrodes are composite catalytic three-dimensional particle electrodes; preferably, the composite catalytic three-dimensional particles are biomass activated carbon or coal-based activated carbon particles supported or doped with a multi-component catalyst; further preferably, the catalyst includes at least two of stannic oxide, zinc oxide, titanium dioxide and rare earth metal oxides; and the first particle electrodes have a particle size of 3-5 mm.

According to the present disclosure, preferably, the second particle electrodes are biomass activated carbon particles or coal-based activated carbon particles, and the second particle electrodes have a particle size of 5-10 mm.

According to the present disclosure, preferably, the light filter material is made of at least one of polyurethane, polypropylene and polyethylene, and the light filter material has a particle size of 15-25 mm, a pore density of 10-40 PPI and a specific surface area of 500-2,000 $m^2/m^3$.

According to the present disclosure, preferably, the third particle electrodes are metal particles and are preferably at least one of magnesium particles, aluminum particles, iron particles and alloy particles thereof; and the third particle electrodes have a particle size of 10-20 mm.

According to the present disclosure, preferably, the filter material basket is a perforated plate made of a polymer insulation material.

In the present disclosure, the filter material basket can be taken out from the three-dimensional electro-flocculation phosphorus removal unit reactor to supplement and replace the third particle electrodes, and the filter material basket and the third particle electrodes therein can be cleaned to recover phosphorus resources.

On the other hand, the present disclosure provides an electrochemical nitrogen and phosphorus removal method. The method uses the electrochemical nitrogen and phosphorus removal treatment device and includes the following steps:

S1: starting the three-dimensional electro-catalytic oxidation unit reactor, the three-dimensional electro-biological coupling unit reactor, the light filter material filter unit reactor and the three-dimensional electro-flocculation phosphorus removal unit reactor; opening the aeration pipes of the three-dimensional electro-catalytic oxidation unit reactor, the three-dimensional electro-biological coupling unit reactor and the three-dimensional electro-flocculation phosphorus removal unit reactor; and turning on the first power supply, the second power supply and the third power supply;

S2: transporting sewage to the electrochemical nitrogen and phosphorus removal treatment device through the main water inlet pipe and enabling the sewage to flow sequentially through the three-dimensional electro-catalytic oxidation unit reactor, the three-dimensional electro-biological coupling unit reactor and the light filter material filter unit reactor; and S3: discharging one part of effluent water of the light filter material filter unit reactor from die electrochemical nitrogen and phosphorus removal treatment device through the main water outlet pipe; transporting another part of the effluent water of the light filter material filter unit reactor to the three-dimensional electro-flocculation phosphorus removal unit reactor; and enabling effluent water of the three-dimensional electro-flocculation phosphorus removal unit reactor to flow back to the light filter material filter unit reactor through the reflux pump and the check valve.

According to the present disclosure, preferably, a removal rate of ammonia nitrogen in effluent water of the three-dimensional electro-catalytic oxidation unit reactor is 40-60%. Operation parameters of the three-dimensional electro-catalytic oxidation unit reactor (including an aeration rate of the three-dimensional electro-catalytic oxidation unit reactor during operation) are determined according to the removal rate of ammonia nitrogen in the effluent water of the three-dimensional electro-catalytic oxidation unit reactor.

According to the present disclosure, preferably, the method further includes flushing the three-dimensional electro-catalytic oxidation unit reactor, wherein the flushing is performed at a frequency of once every 3-7 days to maintain hydraulic patency, and a flushing method includes increasing an aeration rate of the three-dimensional electro-catalytic oxidation unit reactor during operation to a gas-water ratio of (10-20):1.

In the present disclosure, sewage is transported to the three-dimensional electro-catalytic oxidation unit reactor through the main water inlet pipe. Under the action of catalytic oxidation, ammonia nitrogen in the sewage is oxidized, mainly converted into nitrogen and then directly removed, and non-biodegradable organic compounds are converted into easily biodegradable organic compounds, so that the biodegradability of the sewage is improved.

According to the present disclosure, preferably, a procedure for starting the three-dimensional electro-biological coupling unit reactor includes biofilm formation and domestication.

According to the present disclosure, preferably, a biofilm formation method includes transporting an inoculation substance into the three-dimensional electro-biological coupling unit reactor and feeding effluent water of the three-dimensional electro-catalytic oxidation unit reactor into the three-dimensional electro-biological coupling unit reactor until stable, biofilms are formed on surfaces of the second particle electrodes; preferably, the inoculation substance is a cultured special electro-active biological agent and/or activated sludge without impurities obtained from an aeration tank of a municipal sewage treatment plant; and preferably, bacterial flora in the three-dimensional electro-biological coupling unit reactor is *Enterobacter* and/or *Pseudomonas*.

According to the present disclosure, preferably, a domestication method includes intermittently feeding the effluent water of the three-dimensional electro-catalytic oxidation unit reactor into the three-dimensional electro-biological coupling unit reactor, timely measuring changes in quality of effluent water of the three-dimensional electro-biological coupling unit reactor, and observing colors of the biofilms formed on the surfaces of the second particle electrodes until the colors become dark brown; and preferably, the second power supply has a working voltage of 12-36 V when water is fed to the three-dimensional electro-biological coupling unit reactor, and the second power supply has a protection voltage of 5-12 V when the water is not fed to the three-dimensional electro-biological coupling unit reactor, so as to reduce energy consumption.

According to the present disclosure, preferably, effluent water of the three-dimensional electro-biological coupling unit reactor has an ammonia nitrogen content of less than 1.5 mg/L and a COD value of less than 30 mg/L. Operation parameters of the three-dimensional electro-biological coupling unit reactor (including an aeration rate of the three-dimensional electro-biological coupling unit reactor during operation) are determined according to the concentration of ammonia nitrogen in the effluent water of the three-dimensional electro-biological coupling unit reactor.

According to the present disclosure, preferably, the method further includes flushing the three-dimensional electro-biological coupling unit reactor, wherein the flushing is performed at a frequency of once every 1-3 days, and a flushing method includes increasing an aeration rate of the three-dimensional electro-biological coupling unit reactor during operation to a gas-water ratio of (10-20):1. The purpose of the flushing is to maintain renewal of the biofilms.

In the present disclosure, the sewage enters the three-dimensional electro-biological coupling unit reactor from the three-dimensional electro-catalytic oxidation unit reactor, and electro-active microorganisms grow in particles of the second particle electrodes to degrade pollutants in the effluent water of the three-dimensional electro-catalytic oxidation unit reactor while maintaining biological activity by producing and devouring electrons.

According to the present disclosure, preferably, the method further includes back washing the light filter material filter unit reactor, wherein the back washing is performed at a frequency of once every 1-3 days, and a back washing method includes sequentially opening the aeration pipe and the blow-down pipe of the light filter material filter unit reactor after completion of sewage treatment. After the blow-down pipe completes blow-down, the blow-down pipe and the aeration pipe are closed, and influent water is fed again. Preferably, the aeration pipe of the light filter material filter unit reactor has an operation time of 10-15 minutes.

According to the present disclosure, preferably, the concentration of total phosphorus in effluent water of the electrochemical nitrogen and phosphorus removal treatment device is less than 0.5 mg/L, and operation parameters of the three-dimensional electro-flocculation phosphorus removal unit reactor (including an aeration rate of the three-dimensional electro-flocculation phosphorus removal unit reactor during operation) are determined according to the concentration of total phosphorus in the total effluent water of the electrochemical nitrogen and phosphorus removal treatment device.

According to the present disclosure, preferably, the method further includes cleaning the three-dimensional electro-flocculation phosphorus removal unit reactor, wherein the cleaning is performed at a frequency of once every 7-14 days, and a cleaning method includes removing the filter material basket of the three-dimensional electro-flocculation phosphorus removal unit reactor and the third particle electrodes therein, cleaning the three-dimensional electro-flocculation phosphorus removal unit reactor by using an ultrasonic cleaner and obtaining a cleaned crystal solid; and preferably, the cleaned crystal solid is at least one of $MgNH_4PO_4 \cdot 6H_2O$, $Mg_3(PO_4)_2$ and $Mg(OH)_2$. The $MgNH_4PO_4 \cdot 6H_2O$ and/or the $Mg_3(PO_4)_2$ can be used as a phosphate fertilizer.

In the present disclosure, under the action of an electric current, the third particle electrodes in the three-dimensional electro-flocculation phosphorus removal unit reactor can dissolve out metal ions with a flocculation effect to undergo a flocculation reaction with pollutants in the sewage, so that phosphorus, colloids and the like in the sewage form insoluble substances, which are cut off in the filter material basket. Moreover, as one of reactants, $NH_4^+$ can further remove residual $NH_4^+$—N in the sewage. Another part of the dissolved metal ions flow back to the light filter material filter unit reactor with the effluent water of the three-dimensional electro-flocculation phosphorus removal unit reactor through the reflux pump, thereby improving the removal efficiency of the light filter material filter unit reactor. In the light filter material filter unit reactor, various suspended substances are removed through a rapid flocculation reaction and a filtration effect.

According to the present disclosure, preferably, the first power supply, the second power supply and the third power supply are independently a constant-voltage power supply, a constant-current power supply, a unidirectional pulse power supply or a bidirectional pulse power supply; preferably, the bidirectional pulse power supply has a duty ratio of 50-90%, a pulse frequency of 0.01-0.1 Hz, a voltage of 5-36 V, a power-on time of equal to or longer than 5 minutes and a pole reversal time of equal to or shorter than 10 minutes; and preferably, the constant-voltage power supply or the constant-current power supply independently has a voltage of 5-36 V.

In the present disclosure, as a preferred scheme, the power supply of the three-dimensional electro-catalytic oxidation unit reactor is a bidirectional pulse power supply, and an operation method of the bidirectional pulse power supply of the three-dimensional electro-catalytic oxidation unit reactor includes achieving a working state when influent water is fed and achieving a standby state when the influent water is not fed to reduce energy consumption; the power supply of the three-dimensional electro-biological coupling unit reactor is a direct-current regulated power supply; and the power supply of the three-dimensional electro-flocculation phosphorus removal unit reactor is a bidirectional pulse power supply, and an operation method of the bidirectional pulse power supply of the three-dimensional electro-flocculation phosphorus removal unit reactor includes achieving a working state when influent water is fed and achieving a standby state when the influent water is not fed to reduce energy consumption.

The present disclosure is described in detail below through examples.

Example 1

Figure 2:
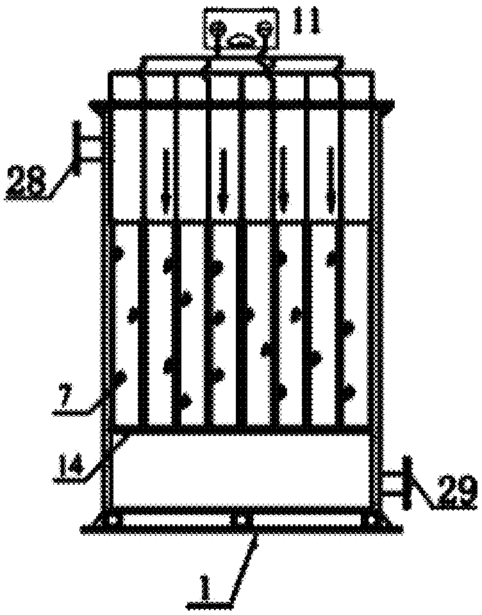
FIG. 2 shows a schematic diagram of a three-dimensional electro-catalytic oxidation unit reactor of the electrochemical nitrogen and phosphorus removal device provided in Example 1 of the present disclosure.
Figure 3:
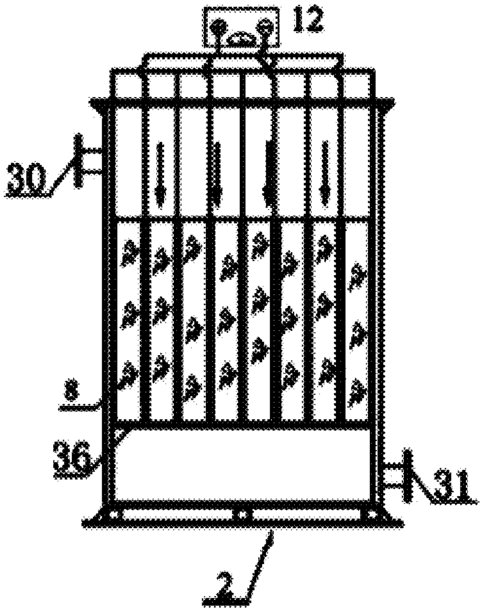
FIG. 3 shows a schematic diagram of a three-dimensional electro-biological coupling unit reactor of the electrochemical nitrogen and phosphorus removal device provided in Example 1 of the present disclosure.
Figure 4:
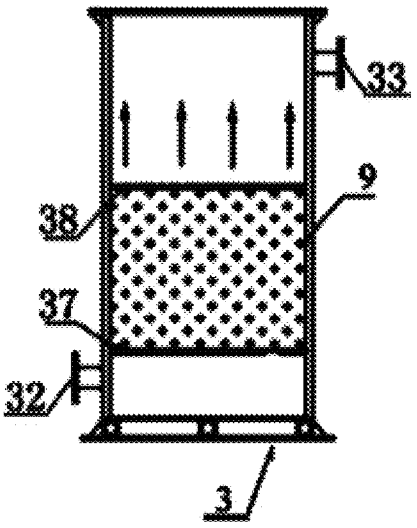
FIG. 4 shows a schematic diagram of a light filter material filter unit reactor of the electrochemical nitrogen and phosphorus removal device provided in Example 1 of the present disclosure.
Figure 5:
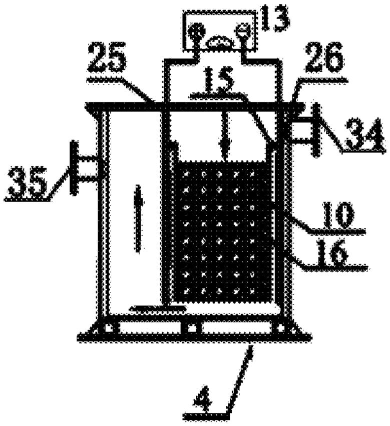
FIG. 5 shows a schematic diagram of a three-dimensional electro-flocculation phosphorus removal unit reactor of the electrochemical nitrogen and phosphorus removal device provided in Example 1 of the present disclosure.

This example provides an electrochemical nitrogen and phosphorus removal device. As shown in FIG. 1 to FIG. 5, the device includes a three-dimensional electro-catalytic oxidation unit reactor 1, a three-dimensional electro-biological coupling unit reactor 2, a light filter material filter unit reactor 3 and a three-dimensional electro-flocculation phosphorus removal unit reactor 4;

a main water inlet pipe 17, the three-dimensional electro-catalytic oxidation unit reactor 1, the three-dimensional electro-biological coupling unit reactor 2 and die light filter material filter unit reactor 3 are sequentially connected; a water outlet pipe 33 of the light filter material filter unit reactor is connected to both a main water outlet pipe 27 and a water inlet pipe 34 of die three-dimensional electro-flocculation phosphorus removal unit reactor; and a water outlet pipe 35 of the three-dimensional electro-flocculation phosphorus removal unit reactor is connected to a water inlet pipe 32 of the light filter material filter unit reactor through a reflux pump 21 and a check valve 22. An aeration pipe 19 and a blow-down pipe 20 are provided at bottoms of tanks of the three-dimensional electro-catalytic oxidation unit reactor 1, the three-dimensional electro-biological coupling unit reactor 2, the light filter material filter unit reactor 3 and the three-dimensional electro-flocculation phosphorus removal unit reactor 4, respectively. The tanks of the three-dimensional electro-catalytic oxidation unit reactor 1, the three-dimensional electro-biological coupling unit reactor 2, the light filter material filter unit reactor 3 and the three-dimensional electro-flocculation phosphorus removal unit reactor 4 are all made from a polymer insulation material.

The three-dimensional electro-catalytic oxidation unit reactor 1 adopts a downward flow mode, a water inlet pipe 28 of the three-dimensional electro-catalytic oxidation unit reactor is arranged at an upper part of the tank of the three-dimensional electro-catalytic oxidation unit reactor 1, and a water outlet pipe 29 of the three-dimensional electro-catalytic oxidation unit reactor is arranged at a lower part of the tank of the three-dimensional electro-catalytic oxidation unit reactor 1; a plurality of first cathode plates 6, a plurality of first anode plates 5, first particle electrodes 7 and a first lower filter plate 14 are arranged between the water inlet pipe 28 and the water outlet pipe 29 of the three-dimensional electro-catalytic oxidation unit reactor; the plurality of first cathode plates 6 and the plurality of first anode plates 5 are arranged in a staggered manner and connected to a negative electrode and a positive electrode of a first power supply 11 through cables, respectively; the first particle electrodes 7 are distributed between the plurality of first cathode plates 6 and the plurality of first anode plates 5; the first lower filter plate 14 is arranged at lower ends of the plurality of first cathode plates 6 and the plurality of first anode plates 5; an electrode spacing between the first cathode plates 6 and the first anode plates 5 is 200 mm; the first cathode plates 6 are stainless steel electrode mesh plates, and the first anode plates 5 are titanium-based mesh plates with titanium dioxide coatings; and the first particle electrodes 7 adopt apricot shell active carbon particles supported with titanium dioxide, which have a particle size of 5 mm.

The three-dimensional electro-biological coupling unit reactor 2 adopts a downward flow mode, a water inlet pipe 30 of the three-dimensional electro-biological coupling unit reactor is arranged at an upper part of the tank of the three-dimensional electro-biological coupling unit reactor 2, and a water outlet pipe 31 of the three-dimensional electro-biological coupling unit reactor is arranged at a lower part of the tank of the three-dimensional electro-biological coupling unit reactor 2; a plurality of second cathode plates 24, a plurality of second anode plates 23, second particle electrodes 8 and a second lower filter plate 36 are arranged between the water inlet pipe 30 and the water outlet pipe 31 of the three-dimensional electro-biological coupling unit reactor; the plurality of second cathode plates 24 and the plurality of second anode plates 23 are arranged in a staggered manner and connected to a negative electrode and a positive electrode of a second power supply 12 through cables, respectively; the second particle electrodes 8 are distributed between the plurality of second cathode plates 24 and the plurality of second anode plates 23; the second lower filter plate 36 is arranged at lower ends of the plurality of second cathode plates 24 and the plurality of second anode plates 23; an electrode spacing between the second cathode plates 24 and the second anode plates 23 is 200 mm; the second cathode plates 24 are stainless steel mesh plates, and the second anode plates 23 are titanium-based mesh plates with titanium dioxide coatings; and the second particle electrodes 8 adopt coal-based activated carbon particles, which have a particle size of 10 mm.

The light filter material filter unit reactor 3 adopts an upward flow mode, and the water outlet pipe 33 of the light filter material filter unit reactor is connected to the water inlet pipe 34 of the three-dimensional electro-flocculation phosphorus removal unit reactor through a reflux pipe 18; the water inlet pipe 32 of the light filter material filter unit reactor is arranged at a lower part of the tank of the light filter material filter unit reactor 3, and the water outlet pipe 33 of the light filter material filter unit reactor is arranged at an upper part of the tank of the light filter material filter unit reactor 3; a third lower filter plate 37, a first upper filter plate 38 and a light filter material 9 arranged between the third lower filter plate 37 and the first upper filter plate 38 are arranged between the water inlet pipe 32 and the water outlet pipe 33 of the light filter material filter unit reactor; and the light filter material 9 is made from a polyurethane sponge, which has a particle size of 25 mm.

The water inlet pipe 34 and the water outlet pipe 35 of the three-dimensional electro-flocculation phosphorus removal unit reactor are arranged on two sides of an upper part of the tank of the three-dimensional electro-flocculation phosphorus removal unit reactor 4, respectively; a filter material basket 16 is movably arranged at a position, close to the water inlet pipe 34 of the three-dimensional electro-flocculation phosphorus removal unit reactor, in the tank of the three-dimensional electro-flocculation phosphorus removal unit reactor 4; third particle electrodes 10 are arranged in the filter material basket 16; a plurality of third cathode plates 26 and a plurality of third anode plates 25 are arranged on two opposite sides of the filter material basket 16, respectively, and the plurality of third cathode plates 26 and the plurality of third anode plates 25 are connected to a negative electrode and a positive electrode of a third power supply 13 through cables, respectively; and bottom edges of the filter material basket 16, the plurality of third cathode plates 26 and the plurality of third anode plates 25 form a liquid channel with the bottom of the tank of the three-dimensional electro-flocculation phosphorus removal unit reactor 4 through a filter material basket support 15. The third cathode plates 26 are stainless steel electrode mesh plates, and the third anode plates 25 are titanium-based mesh plates with titanium dioxide coatings; the third particle electrodes 10 adopt magnesium-aluminum alloy particles, which have a particle size of 20 mm; and the filter material basket 16 is a perforated plate made of a polymer insulation material.

Example 2

This example provides an electrochemical nitrogen and phosphorus removal method. The method uses the electrochemical nitrogen and phosphorus removal treatment device described in Example 1. The method is used for treating decentralized domestic sewage in a high-speed service area. The decentralized domestic sewage in a high-speed service area is a kind of decentralized domestic sewage with a small water discharge volume and a high biochemical cost, and has typical water quality characteristics as follows: the COD value is 300 mg/L, the $NH4^{+}$—N value is 80 mg/L, the TN value is 120 mg/L, the TP value is 15 mg/L, and the COD/TN value is 2.5.

The method includes the following steps:

S1: starting the three-dimensional electro-catalytic oxidation unit reactor 1, the three-dimensional electro-biological coupling unit reactor 2, the light filler material filter unit reactor 3 and the three-dimensional electro-flocculation phosphorus removal unit reactor 4; opening the aeration pipes 19 of the three-dimensional electro-catalytic oxidation unit reactor 1, the three-dimensional electro-biological coupling unit reactor 2 and the three-dimensional electro-flocculation phosphorus removal unit reactor 4; and turning on the first power supply 11, the second power supply 12 and the third power supply 13;

wherein the first power supply 11 is a bidirectional pulse power supply, which has operation parameters including: a duty ratio of 40%, a frequency of 0.04 Hz and a voltage of 20 V; the second power supply 12 is a direct-current regulated power supply, which has a voltage of 24 V; and the third power supply 13 is a bidirectional pulse power supply, which has operation parameters including: a duty ratio of 40%, a frequency of 0.04 Hz and a voltage of 20 V;

S2: transporting sewage to the electrochemical nitrogen and phosphorus removal treatment device through the main water inlet pipe 17 and enabling the sewage to flow sequentially through the three-dimensional electro-catalytic oxidation unit reactor 1, the three-dimensional electro-biological coupling unit reactor 2 and the light filter material filter unit reactor 3;

wherein a procedure for starting the three-dimensional electro-biological coupling unit reactor 2 includes biofilm formation and domestication; a biofilm formation method includes transporting an inoculation substance into the three-dimensional electro-biological coupling unit reactor 2 and feeding effluent water of the three-dimensional electro-catalytic oxidation unit reactor 1 into the three-dimensional electro-biological coupling unit reactor 2 until stable biofilms are formed on surfaces of the second particle electrodes 8; the inoculation substance is activated sludge without impurities obtained from an aeration tank of a municipal sewage treatment plant; a domestication method includes intermittently feeding the effluent water of the three-dimensional electro-catalytic oxidation unit reactor 1 into the three-dimensional electro-biological coupling unit reactor 2, timely measuring changes in quality of effluent water of the three-dimensional electro-biological coupling unit reactor 2, and observing colors of the biofilms formed on the surfaces of the second particle electrodes 8 until the colors become dark brown; and the second power supply 12 has a working voltage of 12-36 V when water is fed to the three-dimensional electro-biological coupling unit reactor 2, and the second power supply 12 has a protection voltage of 5-12 V when the water is not fed to the three-dimensional electro-biological coupling unit reactor 2, so as to reduce energy consumption; and S3: discharging one part of effluent water of the light filter material filter unit reactor 3 from the electrochemical nitrogen and phosphorus removal treatment device through the main water outlet pipe 27; transporting another part of the effluent water of the light filter material filter unit reactor 3 to the three-dimensional electro-flocculation phosphorus removal unit reactor 4; and enabling effluent water of the three-dimensional electro-flocculation phosphorus removal unit reactor 4 to flow back to the light filter material filter unit reactor 3 through the reflux pump 21 and the check valve 22.

The method further includes: (1) flushing the three-dimensional electro-catalytic oxidation unit reactor 1, wherein the flushing is performed at a frequency of once every 3-7 days to maintain hydraulic patency, and a flushing method includes increasing an aeration rate of the three-dimensional electro-catalytic oxidation unit reactor 1 during operation to a gas-water ratio of 10:1; (2) flushing the three-dimensional electro-biological coupling unit reactor 2, wherein the flushing is performed at a frequency of once every 1-3 days, and a flushing method includes increasing an aeration rate of the three-dimensional electro-biological coupling unit reactor 2 during operation to a gas-water ratio of 10:1; and the purpose of the flushing is to maintain renewal of the biofilms; (3) back washing the light filter material filter unit reactor 3, wherein the back washing is performed at a frequency of once every 1-3 days, and a back washing method includes sequentially opening the aeration pipe 19 and the blow-down pipe 20 of the light filter material filter unit reactor 3 after completion of sewage treatment; after the blow-down pipe 20 completes plow-down, the blow-down pipe 20 and the aeration pipe 19 are closed, and influent water is fed again; and the aeration pipe 19 of the light filter material filter unit reactor 3 has an operation time of 10 minutes; and (4) cleaning the three-dimensional electro-flocculation phosphorus removal unit reactor, wherein the cleaning is performed at a frequency of once every 7-14 days, and a cleaning method includes removing the filter material basket of the three-dimensional electro-flocculation phosphorus removal unit reactor and the third particle electrodes therein, cleaning the three-dimensional electro-flocculation phosphorus removal unit reactor by using an ultrasonic cleaner and obtaining a cleaned crystal solid. The cleaned crystal solid is at least one of $MgNH_4PO_4 \cdot 6H_2O$, $Mg_3(PO_4)_2$ and $Mg(OH)_2$, wherein the $MgNH_4PO_4 \cdot 6H_2O$ or the $Mg_3(PO_4)_2$ can be used as a phosphate fertilizer.

The effluent water quality of the electrochemical nitrogen and phosphorus removal treatment device is as follows: an average COD value is 28 mg/L, and an average COD removal rate is 90%; an average $NH_4^+$—N value is 0.8 mg/L, and an average $NH_4^+$—N removal rate is 99%; an average TN value is 13 mg/L, and an average TN removal rate is 89%; and an average TP value is 0.4 mg/L, and an average TP removal rate is 97%. In addition to an impact load of pollutants, the effluent water of the electrochemical nitrogen and phosphorus removal treatment device can stably reach a level A in accordance with Beijing Local Standard (DB11/1612-2019). Compared with a two-dimensional electro-catalytic oxidation technology, an electrochemical nitrogen and phosphorus removal technology of the present disclosure can reduce power consumption by 40% or above, the treatment cost of the present disclosure is basically the same as that of a traditional biochemical treatment method, operation control is simple, and the sludge production is decreased by 60% or above.

Various embodiments of the present disclosure have been described above, and the foregoing description is illustrative, not limiting, and not limited, to the disclosed embodiments. Numerous modifications and changes will be apparent to those skilled in the art without departing from the scope and spirit of the illustrated embodiments.

What is claimed is:

1. An electrochemical nitrogen and phosphorus removal device, wherein the device comprises a three-dimensional electro-catalytic oxidation unit reactor, a three-dimensional electro-biological coupling unit reactor, a light filter material filter unit reactor and a three-dimensional electro-flocculation phosphorus removal unit reactor;

a main water inlet pipe, the three-dimensional electro-catalytic oxidation unit reactor, the three-dimensional electro-biological coupling unit reactor and the light filter material filter unit reactor are connected in series such that sewage flows sequentially from the main water inlet pipe into the three-dimensional electro-catalytic oxidation unit reactor, then into the three-dimensional electro-biological coupling unit reactor, and finally into the light filter material filter unit reactor;

a water outlet pipe of the light filter material filter unit reactor is connected respectively to a main water outlet pipe and a water inlet pipe of the three-dimensional electro-flocculation phosphorus removal unit reactor;

a water outlet pipe of the three-dimensional electro-flocculation phosphorus removal unit reactor is connected to a water inlet pipe of the light filter material filter unit reactor through a reflux pump and a check valve, wherein the check valve is arranged downstream of the reflux pump;

an aeration pipe and a blow-down pipe are provided at bottoms of tanks of the three-dimensional electro-catalytic oxidation unit reactor, the three-dimensional electro-biological coupling unit reactor, the light filter material filter unit reactor and the three-dimensional electro-flocculation phosphorus removal unit reactor, respectively.

2. The electrochemical nitrogen and phosphorus removal device according to claim 1, wherein the tanks of the three-dimensional electro-catalytic oxidation unit reactor, the three-dimensional electro-biological coupling unit reactor, the light filter material filter unit reactor and the three-dimensional electro-flocculation phosphorus removal unit reactor are all made from a polymer insulation material.

3. The electrochemical nitrogen and phosphorus removal device according to claim 1, wherein a water inlet pipe of the three-dimensional electro-catalytic oxidation unit reactor is arranged at an upper part or a lower part of one side of the tank of the three-dimensional electro-catalytic oxidation unit reactor, and a water outlet pipe of the three-dimensional electro-catalytic oxidation unit reactor is arranged at a lower part or an upper part of an opposite side of the tank of the three-dimensional electro-catalytic oxidation unit reactor, so that the water outlet pipe and the water inlet pipe of the three-dimensional electro-catalytic oxidation unit reactor are arranged diagonally;

a plurality of first cathode plates, a plurality of first anode plates, first particle electrodes and a first lower filter plate are arranged between the water inlet pipe and the water outlet pipe of the three-dimensional electro-catalytic oxidation unit reactor; the plurality of first cathode plates and the plurality of first anode plates are arranged in a staggered manner and connected to a negative electrode and a positive electrode of a first power supply through cables, respectively; the first particle electrodes are distributed between the plurality of first cathode plates and the plurality of first anode plates; the first lower filter plate is arranged at lower ends of the plurality of first cathode plates and the plurality of first anode plates;

a water inlet pipe of the three-dimensional electro-biological coupling unit reactor is arranged at an upper part or a lower part of one side of the tank of the three-dimensional electro-biological coupling unit reactor, and a water outlet pipe of the three-dimensional electro-biological coupling unit reactor is arranged at a lower part or an upper part of an opposite side of the tank of the three-dimensional electro-biological coupling unit reactor, so that the water outlet pipe and the water inlet pipe of the three-dimensional electro-biological coupling unit reactor are arranged diagonally;

a plurality of second cathode plates, a plurality of second anode plates, second particle electrodes and a second lower filter plate are arranged between the water inlet pipe and the water outlet pipe of the three-dimensional electro-biological coupling unit reactor;

the plurality of second cathode plates and the plurality of second anode plates are arranged in a staggered manner and connected to a negative electrode and a positive electrode of a second power supply through cables, respectively;

the second particle electrodes are distributed between the plurality of second cathode plates and the plurality of second anode plates;

the second lower filter plate is arranged at lower ends of the plurality of second cathode plates and the plurality of second anode plates;

the water outlet pipe of the light filter material filter unit reactor is connected to the water inlet pipe of the three-dimensional electro-flocculation phosphorus removal unit reactor through a reflux pipe;

the water inlet pipe of the light filter material filter unit reactor is arranged at an upper part or a lower part of one side of the tank of the light filter material filter unit reactor, and the water outlet pipe of the light filter material filter unit reactor is arranged at a lower part or an upper part of an opposite side of the tank of the light filter material filter unit reactor, so that the water outlet pipe and the water inlet pipe of the light filter material filter unit reactor are arranged diagonally;

a third lower filter plate and a first upper filter plate are arranged between the water inlet pipe and the water outlet pipe of the light filter material filter unit reactor, and a light filter material is arranged between the third lower filter plate and the first upper filter plate;

the water inlet pipe and the water outlet pipe of the three-dimensional electro-flocculation phosphorus removal unit reactor are arranged on two sides of an upper part of the tank of the three-dimensional electro-flocculation phosphorus removal unit reactor, respectively;

a filter material basket is movably arranged at a position close to the water inlet pipe of the three-dimensional electro-flocculation phosphorus removal unit reactor, in the tank of the three-dimensional electro-flocculation phosphorus removal unit reactor;

third particle electrodes are arranged in the filter material basket;

a plurality of third cathode plates and a plurality of third anode plates are arranged on two opposite sides of the filter material basket, respectively, and the plurality of third cathode plates and the plurality of third anode plates are connected to a negative electrode and a positive electrode of a third power supply through cables, respectively; and bottom edges of the filter material basket, the plurality of third cathode plates and the plurality of third anode plates form a liquid channel with the bottom of the tank of the three-dimensional electro-flocculation phosphorus removal unit reactor through a filter material basket support.

4. The electrochemical nitrogen and phosphorus removal device according to claim 3, wherein the first cathode plates, the second cathode plates and the third cathode plates are independently selected from a titanium electrode, a titanium-based electrode with a metal oxide coating or a stainless steel electrode;

the first anode plates, the second anode plates and the third anode plates are independently selected from a titanium electrode or a titanium-based electrode with a metal oxide coating;

preferably, the metal oxide coating comprises at least two of stannic oxide, zinc oxide, titanium dioxide and rare earth metal oxides;

an electrode spacing between the first cathode plates and the first anode plates and an electrode spacing between the second cathode plates and the second anode plates are independently 10-200 mm;

the first cathode plates, the second cathode plates, the third cathode plates, the first anode plates, the second anode plates and the third anode plates are independently selected from a flat plate, a mesh plate, a perforated plate or a grid plate;

the first particle electrodes are composite catalytic three-dimensional particle electrodes;

preferably, the composite catalytic three-dimensional particles are biomass activated carbon or coal-based activated carbon particles supported or doped with a multi-component catalyst;

further preferably, the catalyst comprises at least two of stannic oxide, zinc oxide, titanium dioxide and rare earth metal oxides; the first particle electrodes have a particle size of 3-5 mm;

the second particle electrodes are biomass activated carbon particles or coal-based activated carbon particles, and the second particle electrodes have a particle size of 5-10 mm;

the light filter material is made of at least one of a polyurethane sponge, a polypropylene sponge and a polyethylene sponge, and the light filter material has a particle size of 15-25 mm, a pore density of 10-40 PPI and a specific surface area of 500-2,000 m2/m3;

the third particle electrodes are metal particles and are preferably at least one of magnesium particles, aluminum particles, iron particles and alloy particles thereof; the third particle electrodes have a particle size of 10-20 mm; and the filter material basket is a perforated plate made of a polymer insulation material.

5. An electrochemical nitrogen and phosphorus removal method, wherein the method uses the electrochemical nitrogen and phosphorus removal device according to claim 1 and comprises the following steps:

S1: starting the three-dimensional electro-catalytic oxidation unit reactor, the three-dimensional electro-biological coupling unit reactor, the light filter material filter unit reactor and the three-dimensional electro-flocculation phosphorus removal unit reactor; opening the aeration pipes of the three-dimensional electro-catalytic oxidation unit reactor, the three-dimensional electro-biological coupling unit reactor and the three-dimensional electro-flocculation phosphorus removal unit reactor; and turning on a first power supply, a second power supply and a third power supply;

S2: transporting sewage to the electrochemical nitrogen and phosphorus removal device through the main water inlet pipe and enabling the sewage to flow sequentially through the three-dimensional electro-catalytic oxidation unit reactor, the three-dimensional electro-biological coupling unit reactor and the light filter material filter unit reactor; and S3: discharging one part of effluent water of the light filter material filter unit reactor from the electrochemical nitrogen and phosphorus removal device through the main water outlet pipe; transporting another part of the effluent water of the light filter material filter unit reactor to the three-dimensional electro-flocculation phosphorus removal unit reactor; and enabling effluent water of the three-dimensional electro-flocculation phosphorus removal unit reactor to flow back to the light filter material filter unit reactor through the reflux pump and the check valve.

6. The electrochemical nitrogen and phosphorus removal method according to claim 5, wherein a removal rate of ammonia nitrogen in effluent water of the three-dimensional electro-catalytic oxidation unit reactor is 40-60%; and the method further comprises flushing the three-dimensional electro-catalytic oxidation unit reactor, the flushing is performed at a frequency of once every 3-7 days, and a flushing method comprises increasing an aeration rate of the three-dimensional electro-catalytic oxidation unit reactor during operation to a gas-water ratio of 10-20:1.

7. The electrochemical nitrogen and phosphorus removal method according to claim 5, wherein a procedure for starting the three-dimensional electro-biological coupling unit reactor comprises biofilm formation and domestication;

a biofilm formation method comprises transporting an inoculation substance into the three-dimensional electro-biological coupling unit reactor and feeding effluent water of the three-dimensional electro-catalytic oxidation unit reactor into the three-dimensional electro-biological coupling unit reactor until stable biofilms are formed on surfaces of the second particle electrodes;

preferably, the inoculation substance is a cultured special electro-active biological agent and/or activated sludge without impurities obtained from an aeration tank of a municipal sewage treatment plant;

preferably, bacterial flora in the three-dimensional electro-biological coupling unit reactor is *Enterobacter* and/or *Pseudomonas;* a domestication method comprises intermittently feeding the effluent water of the three-dimensional electro-catalytic oxidation unit reactor into the three-dimensional electro-biological coupling unit reactor, timely measuring changes in quality of effluent water of the three-dimensional electro-biological coupling unit reactor, and observing colors of the biofilms formed on the surfaces of the second particle electrodes until the colors become dark brown;

preferably, the second power supply has a working voltage of 12-36 V when water is fed to the three-dimensional electro-biological coupling unit reactor, and the second power supply has the working voltage of 5-12 V when the water is not fed to the three-dimensional electro-biological coupling unit reactor;

the effluent water of the three-dimensional electro-biological coupling unit reactor has an ammonia nitrogen content of less than 1.5 mg/L and a chemical oxygen demand (COD) value of less than 30 mg/L; and the method further comprises flushing the three-dimensional electro-biological coupling unit reactor, the flushing is performed at a frequency of once every 1-3 days, and a flushing method comprises increasing an aeration rate of the three-dimensional electro-biological coupling unit reactor during operation to a gas-water ratio of 10-20:1.

8. The electrochemical nitrogen and phosphorus removal method according to claim 5, wherein the method further comprises back washing the light filter material filter unit reactor, the back washing is performed at a frequency of once every 1-3 days, and a back washing method comprises sequentially opening the aeration pipe and the blow-down pipe of the light filter material filter unit reactor after completion of sewage treatment; and preferably, the aeration pipe of the light filter material filter unit reactor has an operation time of 10-15 minutes.

9. The electrochemical nitrogen and phosphorus removal method according to claim 5, wherein the method further comprises cleaning the three-dimensional electro-flocculation phosphorus removal unit reactor, the cleaning is performed at a frequency of once every 7-14 days, and a cleaning method comprises removing the filter material basket of the three-dimensional electro-flocculation phosphorus removal unit reactor and the third particle electrodes therein, cleaning the three-dimensional electro-flocculation phosphorus removal unit reactor by using an ultrasonic cleaner and obtaining a cleaned crystal solid;

preferably, the cleaned crystal solid is at least one of $MgNH_4PO_4 \cdot 6H_2O$, $Mg_3(PO_4)_2$ and $Mg(OH)_2$; and the concentration of total phosphorus in effluent water of the electrochemical nitrogen and phosphorus removal device is less than 0.5 mg/L, and operation parameters of the three-dimensional electro-flocculation phosphorus removal unit reactor are determined according to the concentration of total phosphorus in the total effluent water of the electrochemical nitrogen and phosphorus removal device.

10. The electrochemical nitrogen and phosphorus removal method according to claim 5, wherein the first power supply, the second power supply and the third power supply are independently a constant-voltage power supply, a constant-current power supply, a unidirectional pulse power supply or a bidirectional pulse power supply;

preferably, the bidirectional pulse power supply has a duty ratio of 40-90%, a pulse frequency of 0.01-0.1 Hz, a voltage of 5-36 V, a power-on time of equal to or longer than 5 minutes and a pole reversal time of equal to or shorter than 10 minutes;

preferably, the constant-voltage power supply or the constant-current power supply independently has a voltage of 5-36 V.

* * * * *